Jan. 4, 1927.
E. R. GURNEY
1,612,810
CUSHION CONNECTION FOR VEHICLE CONSTRUCTION
Filed May 27, 1925
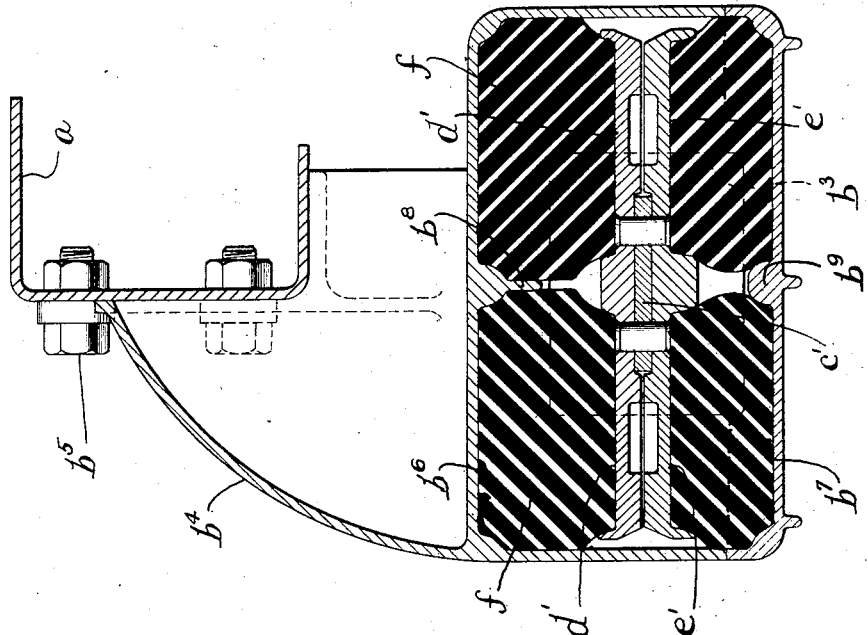
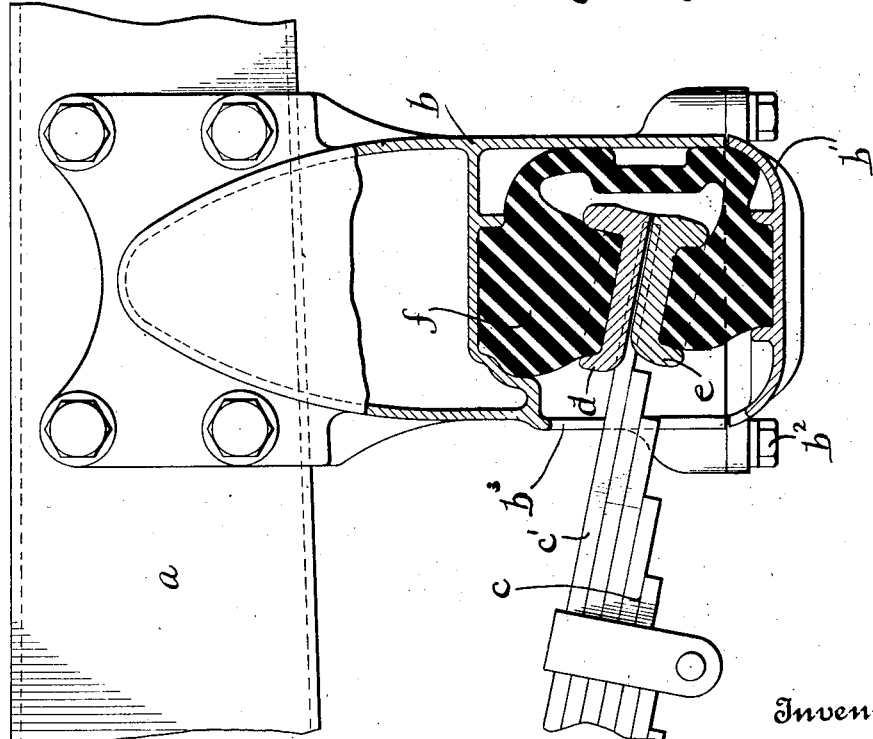
Inventor
Erving R Gurney
By his Attorneys
Redding, Greeley, O'Shea & Campbell Patented Jan. 4, 1927.

1,612,810

UNITED STATES PATENT OFFICE.

ERVING R. GURNEY, OF NEW YORK, N. Y., ASSIGNOR TO INTERNATIONAL MOTOR COMPANY, OF NEW YORK, N. Y., A CORPORATION OF DELAWARE.

CUSHION CONNECTION FOR VEHICLE CONSTRUCTION.

Application filed May 27, 1925. Serial No. 33,078.

This invention relates, in general to cushion connections for vehicle construction of the kind in which yielding non-metallic material serves as a connection and support between two metallic parts of a motor vehicle one of which parts is to be connected to and supported by the other of said parts. Such a connection and support is illustrated in the U. S. patent to Masury & Leipert, No. 1,404,876, dated January 31, 1922. Such cushion connections are applicable in many situations about a motor vehicle as supports, for instance, for the motor, transmission, radiator and the like but the present invention will likely find its greatest applicability as a connection and support between a vehicle spring and the chassis frame. In some situations, and particularly in connection with relatively heavy duty vehicles, such as trucks and buses of maximum size, it may not be found practical to mould blocks of rubber of a size sufficient to co-operate effectively with the large strong vehicle leaf springs required. The principal object, therefore, of the present invention is to reduce the load per square inch on the connection and support. This is accomplished by the use of a plurality of small blocks in place of a single large block which would have been used under previous practice, each of said small blocks being moulded as a complete unit. A further object of the invention is to provide a construction which shall positively prevent the withdrawal of the spring from the housing for the connection and support of yielding non-metallic material regardless of the operativeness of the yielding non-metallic connection and support. To this end the top spring leaf of the vehicle is formed with a bearing surface for the yielding non-metallic material which is of greater lateral dimension than the aperture in the housing through which the spring enters. More particularly the spring leaf may be held between two forgings affording seats for the yielding non-metallic material. These objects and advantages of the invention as well as the means for their attainment will be more apparent from the following detailed description of a preferred embodiment illustrated in the accompanying drawings in which:

Figure 1 is a view in side elevation and partly in section showing the cushion connection and support according to the present invention.

Figure 2 is a vertical transverse sectional view of the connection.

The present invention as has been pointed out hereinbefore is applicable particularly to heavy duty motor vehicles, such as trucks and buses of the larger sizes. A longitudinal side frame member of the chassis of such a vehicle is indicated at $a$. Carried therewith is a housing $b$ formed with the lower side thereof open and closed by a cap $b'$ secured to the housing in any convenient manner as by the bolts $b^2$. The housing is formed with an opening in one side thereof as at $b^3$ through which the end of a vehicle leaf spring $c$ enters the housing. The housing may take any desired shape but is preferably formed with a bracket portion $b^4$ adapted to be secured as by bolts, rivets or the like $b^5$ to the frame member $a$. The aperture $b^3$, as shown in Figure 2 is preferably only of such dimensions as are sufficient to permit the entrance of the spring $c$ and providing necessary clearances to permit such relative movement of the spring as is allowed by the yielding non-metallic material.

The top spring leaf $c'$ carries at its end, within the housing, a broad seat for the yielding non-metallic material of a dimension, in a transverse direction, greater than the diameter in a transverse direction of the aperture $b^3$. Disposed within the housing and engaging the end of the spring as by the said seat member is the yielding non-metallic material. This yielding non-metallic material is preferably of rubber and is retained under compression in that by so retaining the rubber its strength, resiliency and wearing qualities are increased. Preferably this seat member is formed of upper and lower seat members or bearing plates $d$, $e$, respectively, which are formed, on each side of the median line of the spring, with a seat $d'$ and $e'$, respectively, for one block $f$ of the yielding non-metallic material. The bearing members may be forgings and may be secured together and to the end of the spring leaf in any convenient manner as by rivets or the like. Co-operating seats $b^6$ and $b^7$ may be formed in the housing and cover member, respectively, to co-operate with the seats $d'$ and $e'$ to retain blocks of yielding non-metallic material $f$ in position.

Centrally of the housing in the longitudinal median plane of the spring abutments are provided as at $b^8$ and in the cap at $b^9$ and the blocks are so formed as to engage the respective webs and the sides of the housing with a view to overcoming side-sway.

It will thus be seen that a cushion connection has been provided wherein the load per square inch on the yielding non-metallic material is considerably reduced by the provision of a plurality of blocks instead of a single block of maximum size while a positive lock is provided for the spring to prevent the spring from being pulled out through the hole in the housing in the event that the yielding non-metallic material should disintegrate.

Various modifications may be made in the disposition and configuration of the component elements going to make up the connection and support without departing from the spirit and scope of the invention.

What I claim is:

1. A connection and support of yielding non-metallic material adapted to be interposed between two metallic parts of a motor vehicle, one of which parts is to be connected to and supported by the other of said parts comprising, in combination, a housing carried with one of the parts and having an opening in one side thereof through which the end of the other part extends, a seat member carried with the end of the second named vehicle part whereof the transverse dimension exceeds the transverse dimension of the opening in the housing, and yielding non-metallic material disposed within the housing and engaging the seat.

2. A connection and support of yielding non-metallic material adapted to be interposed between two metallic parts of a motor vehicle, one of which parts is to be connected to and supported by the other of said parts comprising, in combination, a housing carried with one of the parts and having an opening in one side thereof through which the end of the other part extends, a seat member carried with the end of the second named vehicle part whereof the transverse dimension exceeds the transverse dimension of the opening in the housing, and a block of yielding non-metallic material disposed within the housing upon either side of the longitudinal median line of the second named vehicle part and engaging the seat.

3. A connection and support of yielding non-metallic material adapted to be interposed between the end of the spring and the chassis frame of a motor vehicle comprising, in combination, a housing carried with the frame and formed with an opening in one side thereof through which the spring extends, a seat member secured to the end of the spring and extending transversely thereof for a material distance beyond its edges, and yielding non-metallic material disposed within the housing and engaging the seat member.

4. A connection and support of yielding non-metallic material adapted to be interposed between the spring and chassis frame of a motor vehicle comprising a housing carried with the frame and having an opening in one side thereof through which the end of the spring extends, a seat member carried with the end of the spring whereof the transverse dimension exceeds the transverse dimension of the opening in the housing, and a block of yielding non-metallic material disposed within the housing and engaging the seat member.

5. A connection and support of yielding non-metallic material adapted to be interposed between the spring and frame of a motor vehicle comprising, in combination, a housing carried with the frame and having an opening in one side thereof through which the end of the spring extends, seat members carried above and below the end of the spring, respectively, and formed with seats which are, respectively, disposed upon opposite sides of the longitudinal median line of the spring co-operating seats formed in the walls of the housing, and blocks of yielding non-metallic material disposed respectively upon either side of the longitudinal median line of the spring between the seats.

6. A connection and support adapted to be interposed between the spring and frame of a motor vehicle comprising, in combination, a housing carried with one of the parts and having an open bottom and an opening in one side through which the end of the spring extends, a closure for the open bottom, said housing and closure being formed with seats, seat members carried above and below the end of the spring, means to secure said seat members to the spring, said seat members being formed with seats co-operating with the seats in the housing, and yielding non-metallic material disposed between the seats.

7. A connection and support adapted to be interposed between the spring and frame of a motor vehicle comprising, in combination, a housing carried with one of the parts and having an open bottom and an opening in one side through which the end of the spring extends, a closure for the open bottom, said housing and closure being formed with seats, seat members carried above and below the end of the spring, means to secure said seat members to the spring, said seat members being formed with seats co-operating with the seats in the housing, and yielding non-metallic material disposed between the seats and retained under compression.

This specification signed this 12 day of May A. D. 1925.

ERVING R. GURNEY.